(No Model.)

O. B. BURNS.
BRAKE FOR BICYCLES.

No. 502,949. Patented Aug. 8, 1893.

Witnesses:
M. Regner
William Franklin

Inventor:
Orcian B. Burns
By Smith + Osborn
Attys.

UNITED STATES PATENT OFFICE.

OREIAN B. BURNS, OF SAN FRANCISCO, CALIFORNIA.

BRAKE FOR BICYCLES.

SPECIFICATION forming part of Letters Patent No. 502,949, dated August 8, 1893.

Application filed January 25, 1893. Serial No. 459,656. (No model.)

*To all whom it may concern:*

Be it known that I, OREIAN B. BURNS, a citizen of the United States, residing in the city and county of San Francisco, State of California, have invented a new and useful Brake for Bicycles, of which the following is a specification.

The object of my invention is to provide a means whereby the brake power is applied directly to the metallic rim of the bicycle-wheel instead of applying it to the rubber or pneumatic tire as heretofore, and thereby prevent the great friction and wear and tear of the tire which soon impairs its usefulness. I attain this end by employing two brake-levers provided with india rubber rollers or brake-shoes which are adapted to work on the inner annular surface of the metallic rim of the forward wheel; the levers being conveniently connected to a stem or handle situated in close proximity to the guiding arms or tillers of the bicycle.

Figure 1:
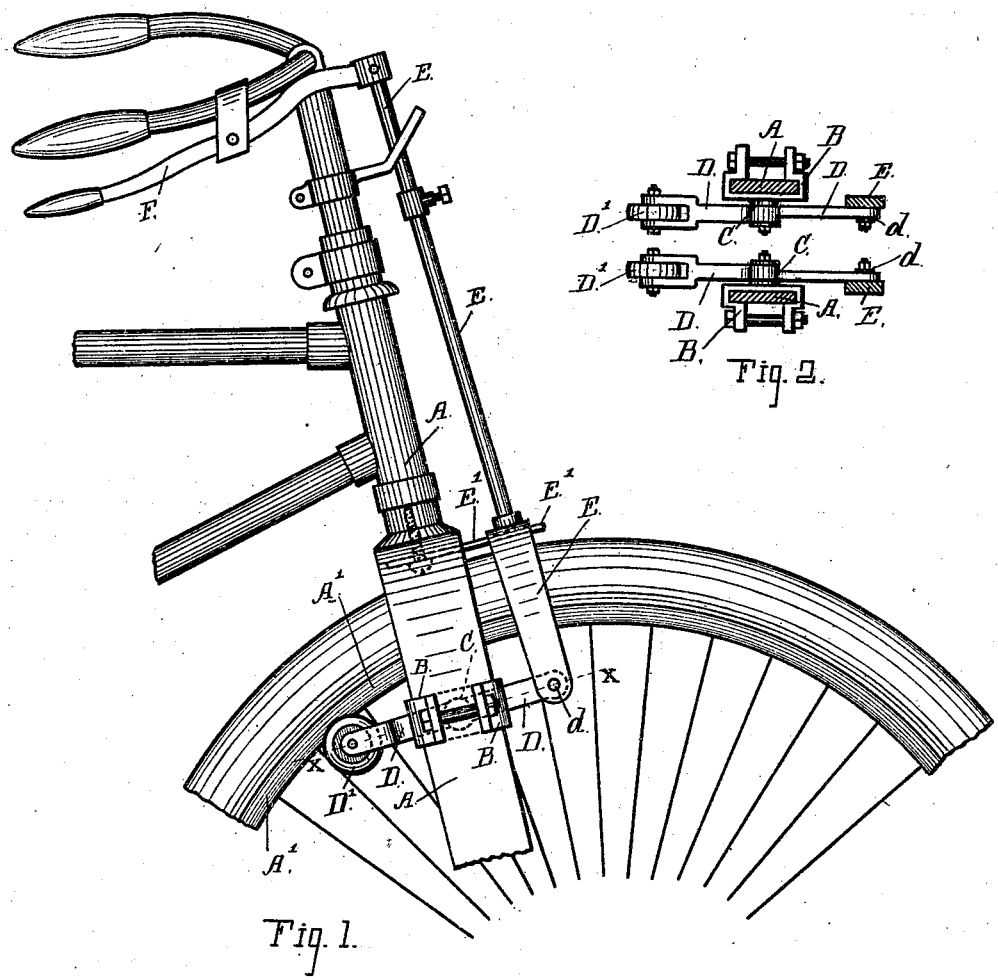
Figure 2:
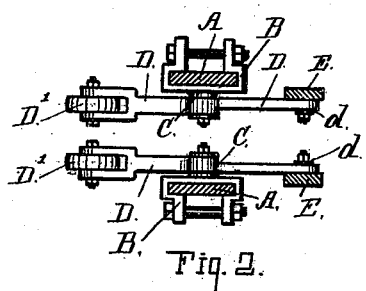
Figure 3:
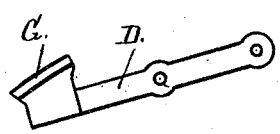

In the accompanying drawings that form part of this specification, Figure 1 represents an elevation of a part of a bicycle with my brake attached thereto. Fig. 2 is a transverse section through line x x Fig. 1. Fig. 3 is a modification of the brake-levers provided with rubber shoes.

The stem or tiller A of my bicycle is bifurcated or forked and is placed astride the rim or tire of the wheel to the arms of which are connected the brake levers D, D. These levers are pivoted to the arms A, A, midway as at C, C, by strap-plates B, B, passing around each arm and move freely on their pivotal points while the outer arm of each lever is pivoted by means of bolts and nuts as at d, d, to the arms of the forked brake-stem or lever E which also straddles the tire of the wheel. Thus it will be seen that the tiller and brake-stem or rod each have two depending arms which connect with the pivoted brake-levers, to the inner ends of which are pivoted the friction wheels or rollers D', D', which are caused to engage the steel or metallic tire carrying the rubber tire when pressure is applied through the medium of the brake-stem E and hand-lever F arresting the progress or rotation of the wheel in an automatic manner and almost instantaneously.

From the construction it is evident that brake-blocks or shoes G, G, may be substituted for the friction wheels or rollers D', D', on the brake-levers D, D, and the same results be obtained.

A flat spring E' is rigidly secured to the fork of the stem or tiller A by means of a set-screw and extends from thence under the fork of the brake-rod E and forms a support or rest for the rod and thereby prevents the friction wheels or rollers from coming in contact with the rim of the wheel until pressure upon the brake-rod is applied and when the pressure is removed will raise and keep the brake-rod in its normal condition and the friction-rollers away from the metal rim.

Having thus described my invention, what I claim, and desire to secure by Letters Patent, is—

1. In a brake mechanism for bicycles, the combination with the wheel and a forked tiller, of the brake-levers carrying friction wheels pivotally connected to the forked arms of the tiller and brake-stem or handle, as described.

2. In a bicycle-brake the combination with the tiller and brake-stem composed of forked-arms placed astride the wheel, of the strap-plates having pivotal points for the brake-levers and connected to forked arms of the tiller by bolts and nuts, as described.

3. The combination and arrangement in a bicycle wheel, of the tiller stem, brake-stem, brake-levers carrying friction rollers and pivotally connected to forked arms of the tiller and brake-stem for joint action, as described.

In testimony that I claim the foregoing I have hereunto set my hand and seal.

OREIAN B. BURNS. [L. S.]

Witnesses:
C. W. M. SMITH,
CHAS. E. KELLY.